Dec. 29, 1959      H. C. OVERTON      2,919,157
DUSTING MECHANISM

Filed June 5, 1958      2 Sheets-Sheet 1

Inventor
Harold C. Overton
By Ronald P. McLaughey
Attorney

Dec. 29, 1959  H. C. OVERTON  2,919,157
DUSTING MECHANISM
Filed June 5, 1958  2 Sheets-Sheet 2
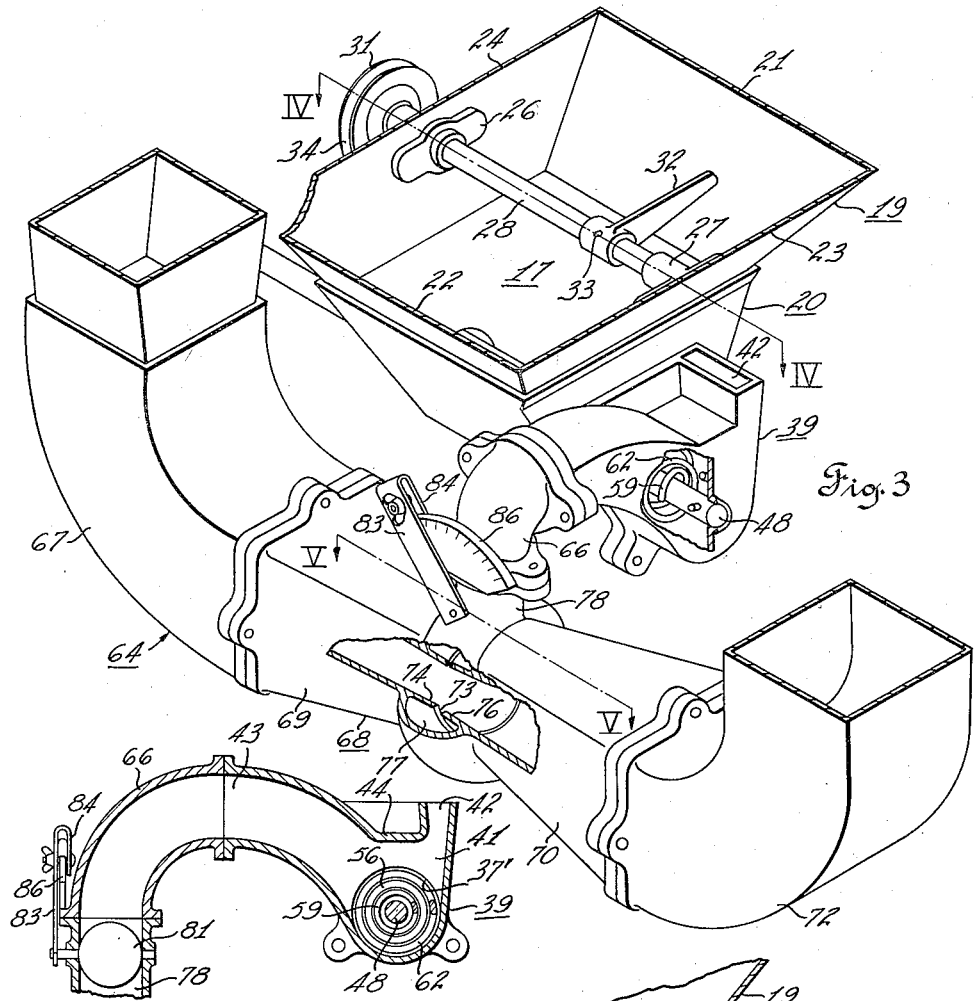
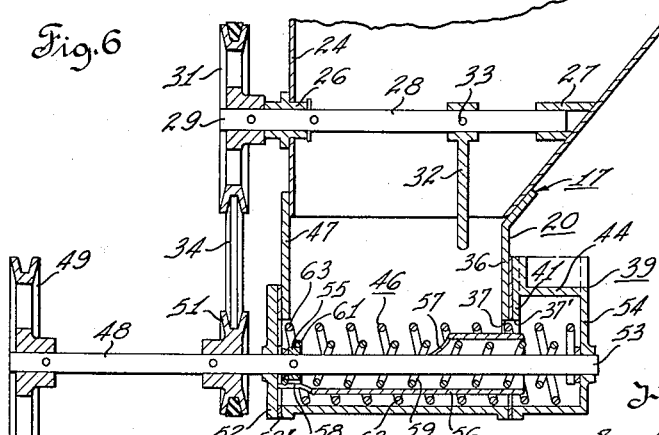
Inventor
Harold C. Overton
By Donald C. McGaughey
Attorney

United States Patent Office 2,919,157
Patented Dec. 29, 1959

2,919,157

DUSTING MECHANISM

Harold C. Overton, Gadsden, Ala., assignor to Allis-Chalmers Manufacturing Company, Milwaukee, Wis.

Application June 5, 1958, Serial No. 740,019

10 Claims. (Cl. 302—51)

This invention relates to dusting equipment and more particularly to dusters of the type adapted to discharge finely atomized powder into the air in predetermined and accurate quantities.

Dusting equipment heretofore known has been of two general types. In the first type the dust is drawn from the hopper and fed into the blower or fan for discharge from the high pressure side thereof. The second type is that in which the fan exhausts through an outlet pipe which passes beneath a hopper from which the dust is precipitated into the air stream. In both types of dusters feed control is dependent on variability of the dust entry opening in order that the rate of flow therethrough may be metered. To aid in metering the dust through the openings it is common practice to have an agitator operating over or adjacent the opening to prevent bridging or packing of the dust hopper.

Dusters of the above outlined type have not been entirely satisfactory particularly in regard to the matter of variable feed rate control of the dust. One factor adversely affecting feed rate control in dusters of the above outlined type is the head or pressure of dust at the opening. This pressure varies according to the amount of dust in the hopper and results in the dust passing through the openings in varying quantities. The addition of high speed agitators does not alter the variable feed rate caused by changes in the head of dust in the hopper. Low speed agitators while less sensitive to the head of dust are more apt to allow bridging or build-up of dust in the hopper when certain types of dust are encountered. Heretofore the metering of dust through a variable area opening has not produced accurate control of dust concentration in the exhausted air stream. In an effort to overcome these shortcomings it has been suggested that part of the air stream from the blower be diverted from the high pressure side of the blower and diverted through the dust hopper for dust pickup. The dust laden air which is exhausted from the hopper is then circulated back through the blower discharge. These constructions present several problems. The flow of air through the hopper creates a pressure therein and if the hopper is not air tight dust will exhaust through any available opening. Further, the amount of dust furnished to the pickup area must be controlled and here again the head of dust causes a varying feed rate which is undesirable. In addition, many of the dust compounds are of a highly corrosive nature and the recirculation of dust laden air through the blower results in corrosive deterioration of the blower and component parts.

Generally it is an object of the present invention to provide a dusting mechanism which uniformly distributes dust to the atmosphere in the manner which avoids the shortcomings outlined hereinabove.

Another object of this invention is to provide a duster in which no air flow is directed through the dust hopper and in which it is not necessary for the dust to be precipitated or dropped into an air stream.

Another object of this invention is to provide an improved dust pickup mechanism which affords a uniform rate of dust distribution to the discharge air stream of the blower regardless of the head or amount of dust in the hopper.

Another object of the invention is to provide an improved feed rate control for accurately regulating the amount of dust distributed into the discharge air stream of the blower.

A still further object of the present invention is to provide a dusting mechanism of the above outlined character in which the dust laden air does not recirculate through the blower or fan.

The foregoing and other objects and advantages are attained by the present invention, various novel features of which will become apparent from the description herein and accompanying drawings disclosing a preferred embodiment of the invention and as will be set forth in the appended claims.

Referring to the drawings:

Fig. 3 is a sectional perspective view of part of the dusting mechanism taken along line III—III of Fig. 2 with some parts broken away and shown in section for purposes of disclosure;

Fig. 4 is a sectional view of the dusting mechanism shown in Fig. 3 taken along line IV—IV of Fig. 3;

Fig. 6 is a sectional view taken along line VI—VI of Fig. 2.

Figure 1:
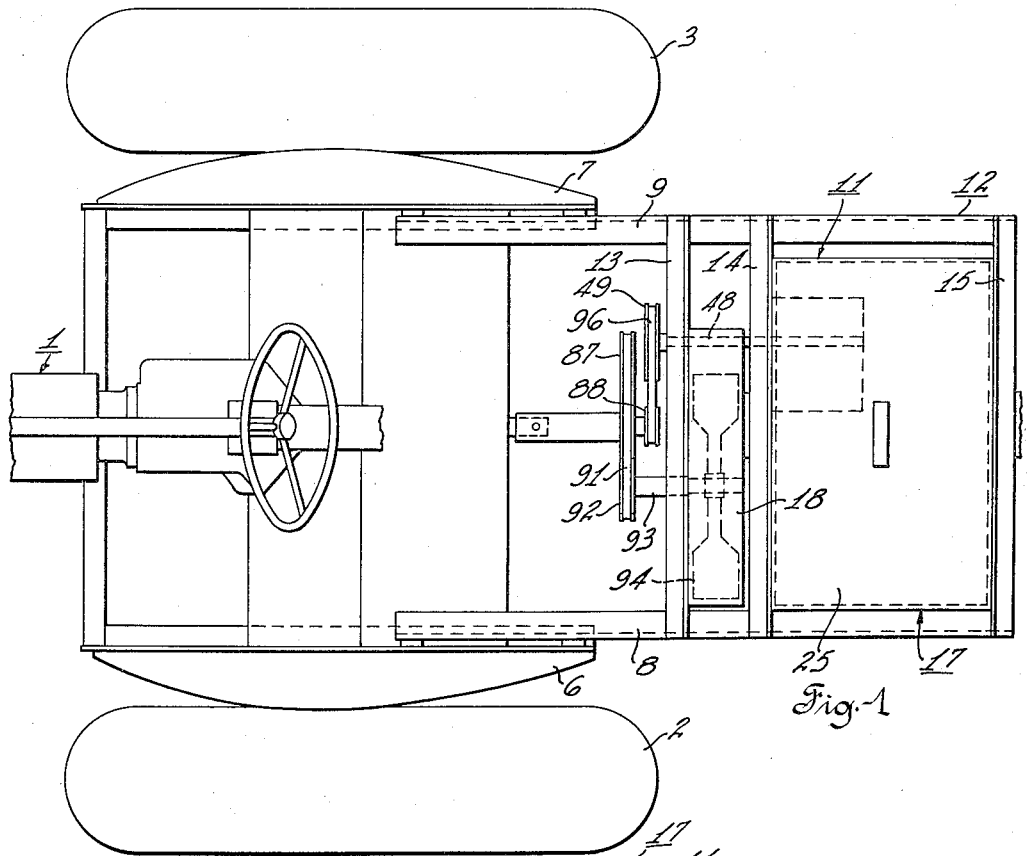
Fig. 1 is a plan view of applicant's dusting mechanism mounted on a tractor.
Figure 2:
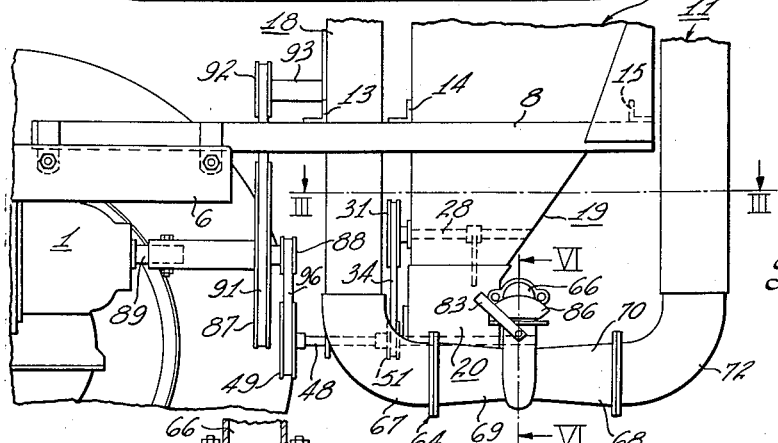
Fig. 2 is a side elevational view of the tractor and dusting mechanism shown in Fig. 1.

Referring to Fig. 1 the reference character 1 indicates generally a conventional farm tractor. The tractor 1 includes a pair of spaced rear traction wheels 2 and 3 and the usual operator's station including the conventional steering, shift, brake and clutch controls. The tractor further includes a pair of fender members 6 and 7 to which frame members 8 and 9 are detachably mounted as by bolting and which are adapted to support a crop dusting mechanism 11. The dusting mechanism 11 is supported on a subframe structure 12 which includes the transversely spaced frame members 8 and 9 and a series of three longitudinally spaced angle iron members 13, 14 and 15 which are rigidly secured as by bolting in interconnecting relation to frame members 8 and 9. Referring to Fig. 2 it will be noted that the hopper 17 of the dusting mechanism 11 is rigidly secured between channels 14 and 15 as by bolting and that a conventional blower 18 having the usual air intake and outlet is rigidly secured to the channel 13 in a similar manner.

The dust hopper 17 as best appears in Figs. 3 and 4 includes an upper section 19 comprising three outwardly diverging side walls 21, 22, 23 and a vertical front wall 24. The hopper further includes a lower section 20 which is secured to the side walls of the upper portion 19 as by bolting. A suitable cover 25 is provided to enclose the top of the hopper 17. The front and rear side walls 24 and 23 of the hopper 17 mount bearing brackets 26 and 27 which are adapted to receive an agitator shaft 28. One end 29 of the agitator shaft extends outside of the hopper 17 and mounts sheave 31 which is driven by a V-belt 34 connected with the power train of the duster in a manner which will be more fully described hereinbelow. The shaft 28 mounts an agitator arm 32 which is fixedly secured thereon by a retractable set screw 33. It will be appreciated that one or more of the agitator arms may be provided and if desired the set screw 33 may be disengaged allowing the shaft to rotate freely thus avoiding agitation entirely.

A dust pickup housing 39 is connected in dust receiving relation to the lower section 20 of hopper 17. As shown in Fig. 4 the rear wall 36 of the lower section 20 is apertured as at 37 and the forward wall 41 of the dust pickup housing is provided with an aperture 37' similar to that in rear wall 37. In assembly the wall 41 of housing 39 is placed in face to face engagement with wall 36 so that the apertures of the respective walls are in registry with each other and the housing is maintained in place by bolting. Referring to Figs. 3 and 6 it will be noted that the dust pickup housing 39 is provided with an air intake aperture 42 and an air outlet aperture 43. The vertical height of the dust pickup housing 39 is such that a clearance area exists above the top of the dust receiving apertures 37 and 37' and the top wall 44 of the pickup compartment. The general purpose of the housing 39 is to provide a limited area of dust over which an air stream passes for purposes of dust pickup as will be more fully explained hereinbelow.

A dust conveying means or assembly generally designated by the reference character 46 is mounted in the lower section 20 of the hopper 17 and extends into the housing 39. As best appears in Fig. 4 the front wall 47 of lower section 20 is apertured to receive the conveying means or assembly 46. The assembly 46 includes a main drive shaft 48, the forward end of which fixedly mounts a power input sheave 49. A driven sheave 51 for driving agitator shaft 28 is mounted intermediate the driving sheave 49 and the front wall 47 of the lower section 20 and is connected in driving relation with sheave 31 by the V-belt 34. Shaft 48 is rotatably supported at the front wall 47 of the lower section 20 by means of an end plate 52 having a bearing aperture adapted to receive the shaft 48. The rear end 53 of the auger shaft is rotatably mounted in a suitable bearing aperture in the wall 54 of dust pickup housing 39. A collar 55 is pinned to auger drive shaft 48 for the purpose of preventing its axial withdrawal from hopper 17.

The conveying assembly 46 further includes a sleeve 56 which is formed integral with the end plate 52 and is supported thereby. The sleeve has an elongated upper dust admitting cutout 57 and a lower dust admitting cutout 58. A dust conveying or supply means in the form of a coil spring auger or conveying element 59 is mounted concentrically within sleeve 56 in surrounding relation to the main shaft 48 and has one end 61 thereof secured in driven relation thereto. The inner auger 59 is pitched for the purpose of conveying material from the hopper 17 into the dust pickup housing 39. A second dust conveying means in the form of auger 62 is mounted in surrounding relation to sleeve 56 and has one end 63 secured in driven relation to shaft 48. The outer auger constitutes excess dust return means and is pitched for the purpose of conveying material back from the dust pickup chamber into the dust hopper.

In assembly the end plate 52, sleeve 56, augers 59 and 62 are mounted on shaft 48 and this unit is inserted through the aperture in front wall 47 until the end 53 is seated in the aperture presented by the rear wall 54 of the housing 39. The end plate 52 is secured in position by bolting (not shown) and a suitable gasket 52' is provided for assuring a dust tight connection. When installed the dust supply means 59 is operatively connected between the hopper section 20 and the housing 39.

The augers 59 and 62 which form the dust supply and return means are coaxially mounted on the shaft 48 and due to the reverse pitches of the augers unidirectional rotation of shaft 48 will result in a constant flow of dust being augered in opposite directions, that is, into the housing 39 by the inner auger 59 and out of housing 39 by the outer auger 62 to the hopper 17. This action assures a constant supply of agitated dust in the housing 39. The feed rate of both augers is substantially the same and the level of dust does not rise above the top of the return auger 62. As a clearance area exists between auger 62 and top wall 44 (Fig. 6) there is a space which permits air to enter through the air intake aperture 42, pass over the agitated dust and exit through the air outlet aperture 43.

The air outlet 43 of dust pickup housing 39 is connected with a blower discharge main assembly 64 by a branch conduit 66. Referring particularly to Fig. 3 it will be seen that the assembly 64 includes a blower exhaust main 67, a restricted throat portion or venturi 68 having an intake section 69 and an exhaust section 70 and a distributing duct 72. As will be more fully explained hereinbelow the venturi 68 constitutes means for impelling a current of air through the housing 39. The blower exhaust main 67, venturi 68 and distributing duct 72 are secured together as by bolting. The intake section 69 has a gradual reduction in cross sectional area terminating in an annular end 74. The exhaust section 70 has a gradual increase in cross sectional area from an annular end 76 adjacent end 74 to a point of connection with duct 72. It will be noted that the spacing of facing ends 74 and 76 of sections 69 and 70 will define an annular aperture indicated by the reference numeral 73. The facing ends 74 and 76 are circular in configuration in order that the pressure drop will be the same at all points about the annular aperture. While throat designs other than circular may be used they would cause variations in the pressure drop and possibly areas of little or no pressure drop in instances of sharp corners. An annular duct 77 surrounds the annular aperture 73 in communicating relation thereto and is provided with a suitable inlet at 78. The branch conduit 66 is connected in communicating relation between the air outlet aperture 43 of the housing 39 and the inlet 78. The amount of dust air mixture which passes through branch conduit 66 may be controlled by valve means 81 mounted therein. The valve 81 is of the butterfly type and is provided with a convenient control handle 83 which has a turned over portion 84 in registry with a calibrated dial 86.

The duster is driven by the power take-off shaft 89 (Fig. 2) of the tractor 1. The power train includes first and second sheaves 87 and 88, respectively, which are mounted on the power take-off shaft 89. The large driving sheave 87 is connected, as with V-belt 91, with a driven sheave 92 which in turn drives shaft 93 to operate the blower impeller 94. The small driving sheave 88 is connected by a V-belt 96 with the auger drive shaft sheave 49. Upon actuation of the power take-off shaft 89 of the tractor 1 the impeller 94 is put into operation drawing air into the blower intake (not shown) and a flow of air passes through the blower exhaust main 67, the venturi 68 and out the distributor duct 72. At the same time the auger drive shaft 48 is actuated and the inner feed auger 59 will carry dust out of the hopper 17 into the dust pickup housing 39. The return auger 62 will carry dust back to the hopper 17 thereby maintaining a constant flow of dust through the pickup chamber 39 at a constant level.

Figure 5:
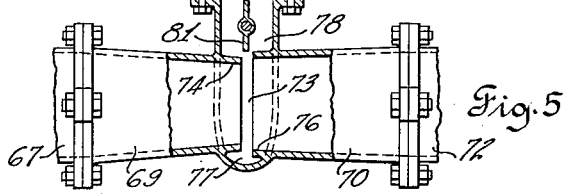
Fig. 5 is a partial sectional view taken along line V—V of Fig. 3.

As the air from blower 18 passes through the intake section 69 of the venturi the constriction or reduction in cross sectional area causes the air velocity to increase and as a result the static pressure of the air is decreased at the restricted portion. This decrease in pressure creates a partial vacuum in the annular duct 77 which surrounds the annular opening 73 thereby inspirating atmospheric air through the air intake aperture 42 of the dust pickup housing 39. In passing through the pickup housing the air flows over the surface of the auger agitated dust at a velocity adapted to pick up dust so that a concentrated dust air mixture is formed. The concentrated dust laden air continues through the branch conduit 66 into the duct 77 surrounding the restricted throat portion of the venturi where it is drawn into the exhaust section 70 where it admixes with the blower air. From this point it travels through the distributor duct into any suitable type dust distributing head (not shown) in a conventional manner. As shown in Fig. 5 the diameter of end 74 of the intake section 69 is smaller than the diameter of end 76 presented by the exhaust section. The relative differences in diameter provide a step-up in cross sectional area at the annular aperture 73 which aids in the admission of air and dust from the annular duct 77 into the main air stream. It will be understood that it would be possible to admit dust laden air at one point of the constricted portion but such a design would not efficiently utilize the full capacity of the venturi and would reduce the volume flow of air below that which is obtainable with an annular aperture.

During operation the amount of air which is inspirated into the current of air coming from the blower may be varied as desired by manipulating the setting of the butterfly valve 81 shown in Fig. 6. It will be appreciated that the inspirated flow of atmospheric air through the dust pickup chamber 39 may be reduced to practically nothing if so desired thus resulting in a minimum amount of dust pickup. Of course, should a maximum amount of dust pickup be desired the butterfly valve would be positioned parallel to the flow of air thus permitting maximum air flow through the dust pickup chamber.

From the above description of the operation of the duster it will be appreciated that at no time does the dust pass through the blower nor is dust precipitated or dropped into the air stream. This results in longer blower life, minimum wear on all moving parts and the necessity of providing an air tight hopper. In addition, the augers 59 and 62 in the dust hopper 17 which carry dust to and from the dust pickup housing constantly agitate the dust and prevent any bridging or buildup of material in the bottom of the hopper and in housing 39. Further agitation in the upper portion of the hopper is afforded by the arm 32 which can be actuated as desired.

Provision of the agitators prevents any possibility of dust bridging at any point in the hopper. Should the dust tend to bridge and lump the agitator 32 the feed augers 59 and 62 will pulverize the dust to a degree sufficient to permit ready pickup by the secondary air stream in housing 39. The positive agitation of the dust through the provision of the augers prevents any possibility of clogging within the dust feed mechanism. Further, by having an auger in communication between the hopper and the dust pickup chamber it is impossible for the head or the amount of dust in the hopper to have any effect whatsoever on the dust feed rate control to the exhausted air stream.

In essence, the accurate metering of dust is attained by the use of a control valve which is located in the secondary air stream. The secondary air stream picks up the dust and carries it into the hollow annulus surrounding the venturi tube where it is delivered into a primary air stream. The use of the secondary air stream makes it unnecessary to use air tight dust hoppers and avoids any necessity of recirculating dust through the blower.

What is claimed is:

1. A duster comprising a dust hopper, a dust pickup housing, dust supply means operatively connected between said hopper and said housing including a conveying element, a blower having an air intake and an air discharge main, a branch conduit connected in communicating relation between said dust pickup housing and said main, means impelling a current of air through said housing at a velocity adapted to pick up dust therein so that a dust air mixture will pass through said conduit into said main for admixing with said blower air and discharge therewith, and an excess dust return means operatively connected between said housing and said hopper adapted to convey excess dust back to the latter.

2. The combination recited in claim 1 wherein said dust supply and return means include coaxially mounted auger conveyers adapted to move dust in opposite directions upon unidirectional rotation of said augers.

3. A duster comprising a dust hopper having a dust pickup housing in communication therewith, a dust conveying auger mounted in said hopper and extending into said housing for conveying a constant supply of dust to the latter, a blower having an air intake and an air discharge main presenting a constricted throat portion, a branch conduit mounted in communicating relation between said housing and said constricted throat portion of said main, passage of air through said constricted portion creating an area of low pressure at said throat portion operative to inspirate air through said housing and branch conduit at a velocity adapted to pick up dust so that a dust air mixture will pass through said conduit into said main for admixing with said blower air and discharge therewith, and a dust return auger operatively connecting said hopper in dust receiving relation with said housing so that a constant level of dust will be maintained in said housing for exposure to said inspirated air flow.

4. A duster comprising a dust hopper, a dust pickup housing mounted in dust receiving relation to said dust hopper, a sleeve disposed in said hopper and extending between the latter and said housing, conveying means mounted within said sleeve, a dust return means mounted in surrounding relation to said sleeve, means for driving said conveying and return means to provide a constant flow of dust through said housing, a blower having an air intake and an air discharge main, a branch conduit connected in communicating relation between said housing and said main, and means impelling a current of air through said housing at a velocity adapted to pick up dust therein so that a concentrated dust air mixture will pass through said branch conduit into said main for admixing with said blower air and discharge therewith.

5. A duster comprising a dust hopper, a dust pickup housing mounted in dust receiving relation to said dust hopper, a sleeve disposed in said hopper and communicating between the latter and said housing, a dust supply auger mounted within said sleeve, a dust return auger mounted in surrounding relation to said sleeve, means for driving said supply and return augers to provide a constant flow of dust through said housing, a blower including an air intake and an air discharge main having a constricted throat portion, a branch conduit connected in communicating relation between said housing and said constricted throat portion of said main, passage of air through said constricted throat portion creating an area of low pressure at said branch conduit operative to inspirate a current of air through the latter and said housing at a velocity adapted to pick up dust therein so that a concentrated dust air mixture will pass through said conduit into said main for admixing with said blower air and discharge therewith.

6. A duster comprising a dust hopper, a dust pickup housing connected in dust receiving relation to said hopper, a blower having an air intake and an air discharge main, said main having a gradual reduction in cross sectional area to provide a constricted throat portion and a gradual increase in cross sectional area from said throat portion, said throat portion having an annular aperture, an annular duct surrounding said aperture in communicating relation therewith, a branch conduit connected in communicating relation between said annular duct and said housing, said constricted portion increasing the velocity of air flowing therethrough to create an area of low pressure at said annular aperture effective to inspirate a current of air through said pickup housing at a velocity adapted to pick up dust therein so that a dust air mixture will pass through said conduit into said main for admixing with said blower air and discharge therewith.

7. A duster comprising a dust hopper, a dust pickup housing mounted in dust receiving relation to said dust hopper, a sleeve disposed in said hopper and communicating between the latter and said housing, a dust feeding auger mounted within said sleeve, a dust return auger mounted in surrounding relation to said sleeve, means for driving said feeding and return augers to provide a constant flow of dust through said housing, a blower having an air intake and an air discharge main, said main including an intake section having a gradual reduction in cross sectional area to provide a constricted throat portion and an exhaust section having a gradual increase in cross sectional area from said throat portion, said throat portion having an annular aperture, a branch conduit connected in communicating relation between said annular aperture and said housing, said constricted portion increasing the velocity of air flowing therethrough to create an area of low pressure at said annular aperture effective to inspirate a current of air through said pickup housing at a velocity adapted to pick up dust therein so that a dust air mixture will pass through said conduit into said main for admixing with said blower air and discharge therewith.

8. The combination recited in claim 7 wherein the portion of said intake section which defines one side of said annular aperture is uniformly less in diametrical area than the portion of said exhaust section which defines the other side of said annular aperture to afford even distribution of said dust air mixture into said blower air stream.

9. A duster comprising a dust hopper having a dust outlet and a dust inlet; a dust pickup housing having dust inlet and outlet and air inlet and outlet openings; means connecting said hopper dust outlet in dust supplying relation to said dust inlet of pickup housing; means connecting said dust outlet of said housing in dust returning relation to said dust inlet of said hopper, said supply and return means providing a constant flow of dust through said housing; a blower having an air intake and an air discharge main; said main having a gradual reduction in cross sectional area to provide a constricted throat portion and a gradual increase in cross sectional area from said throat portion; said throat portion having an annular aperture; a branch conduit connected between said annular aperture and said air outlet of said dust pickup housing; said constricted portion increasing the velocity of air flowing therethrough to create an area of low pressure at said annular aperture effective to inspirate a current of air through said housing air inlet at a velocity sufficient to pick up dust therein, said dust laden air passing through said housing air outlet and said branch conduit into said main for admixing with said blower air and discharge therewith.

10. A duster comprising a dust hopper; a dust pickup housing connected in dust receiving relation to said hopper and having air inlet and outlet openings; a sleeve mounted in said hopper and extending into said housing; a dust feeding auger mounted concentrically within said sleeve to extend from said hopper into said housing; a dust return auger mounted in surrounding relation to said sleeve to extend from said housing to said hopper; means for driving said feeding and return augers to provide a constant flow of agitated dust through said housing; a blower having an air intake and an air discharge main, said main having a gradual reduction in cross sectional area to provide a constricted throat portion and a gradual increase in cross sectional area from said throat portion, said throat portion having an annular aperture; a branch conduit connected between said annular aperture and said housing air outlet; said constricted portion increasing the velocity of air flowing therethrough to create an area of low pressure at said annular aperture effective to inspirate a current of air through said housing air inlet at velocity sufficient to pick up dust therein; said concentrated dust laden air passing through said housing air outlet and branch conduit into said main for admixing with said blower air and discharge therewith.

References Cited in the file of this patent

UNITED STATES PATENTS

| 1,885,437 | Harazin | Nov. 1, 1932 |
| 1,970,405 | Thomas | Aug. 14, 1934 |

FOREIGN PATENTS

| 7,263 | Great Britain | May 14, 1915 |
| 942,154 | France | Sept. 13, 1948 |